April 10, 1934.  G. L. FISK ET AL  1,954,123
COOLING BED
Filed July 11, 1931  8 Sheets-Sheet 1

INVENTORS
Gustaf L. Fisk,
Edward T. Peterson,

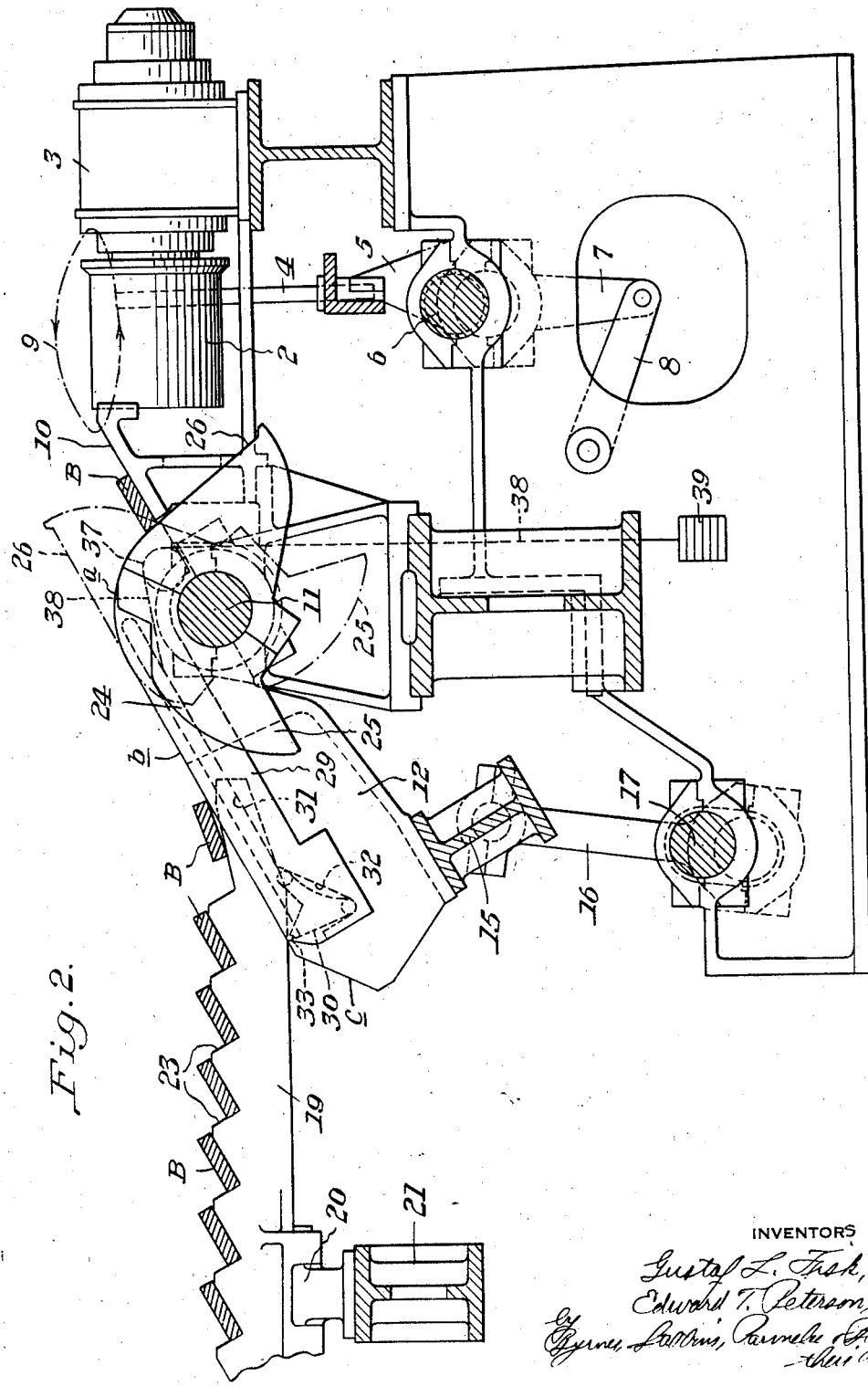

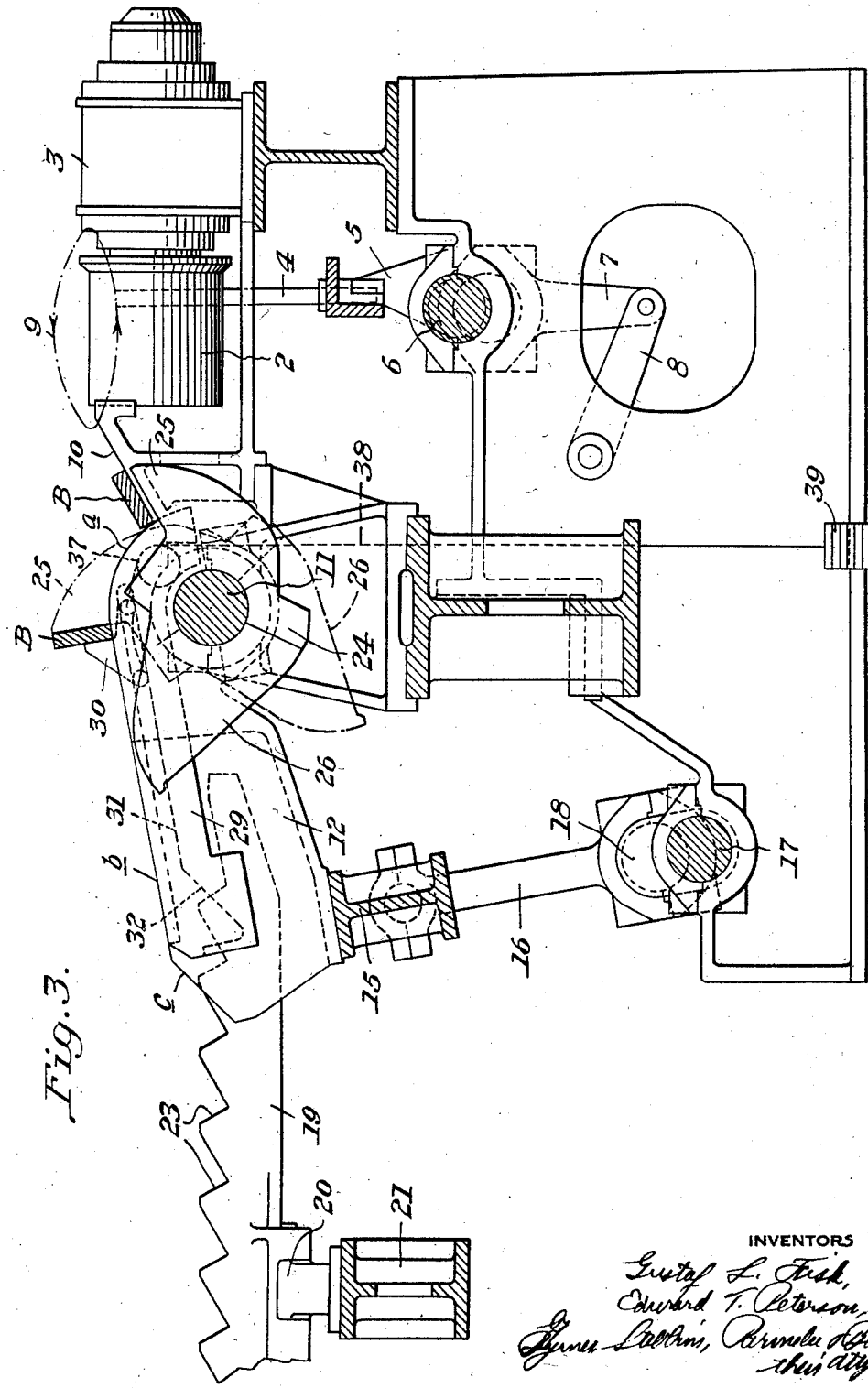

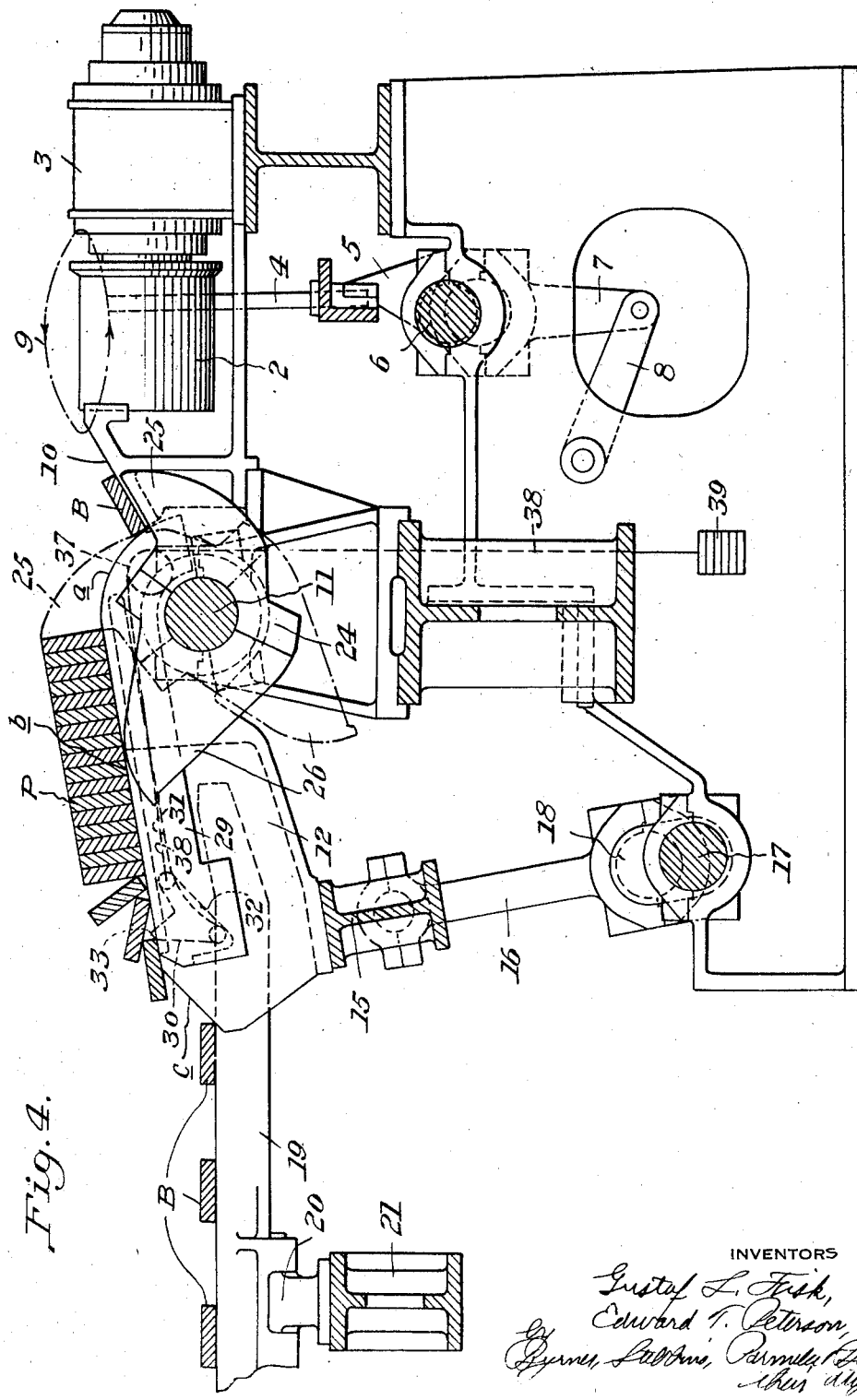

April 10, 1934.  G. L. FISK ET AL  1,954,123
COOLING BED
Filed July 11, 1931  8 Sheets-Sheet 5
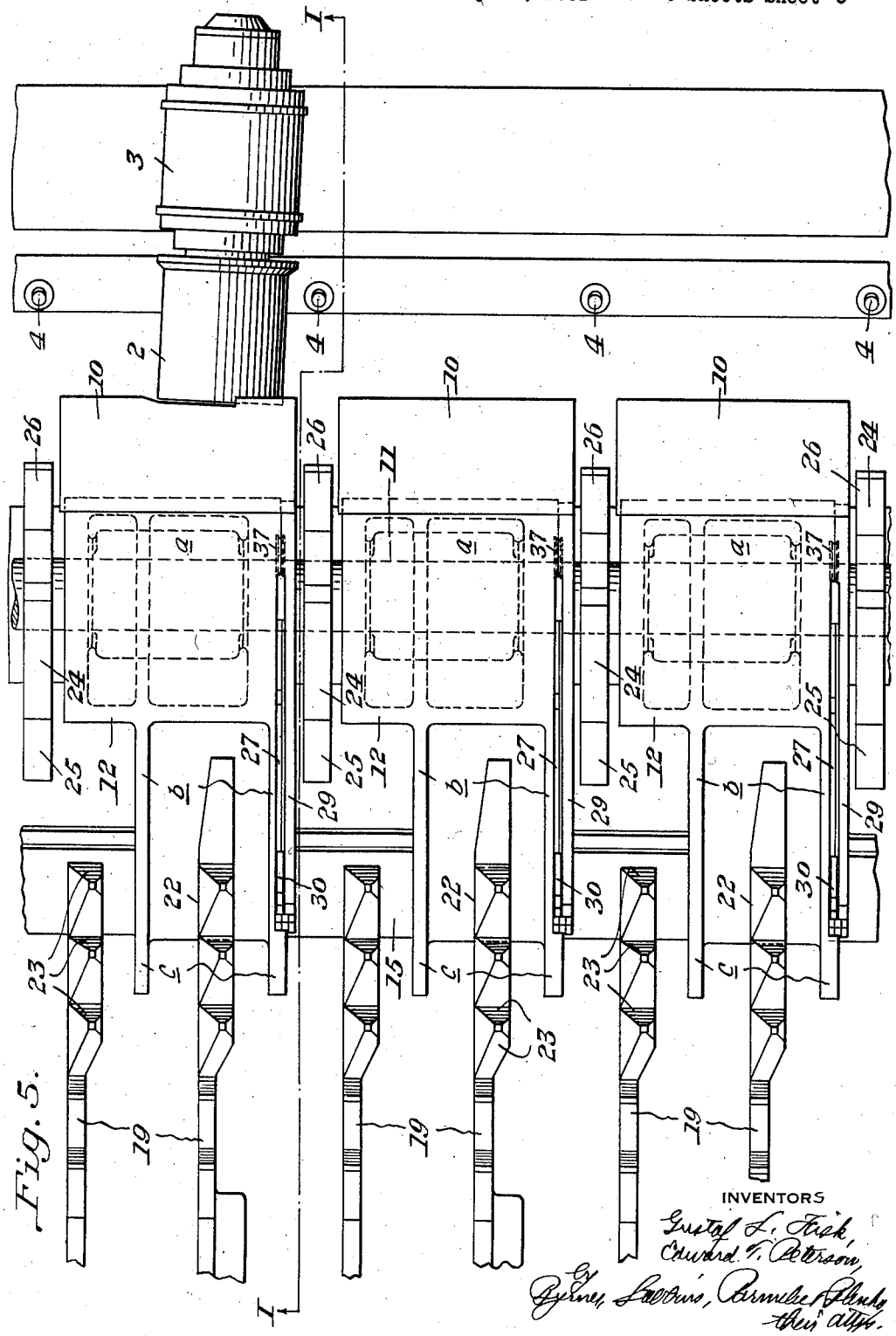

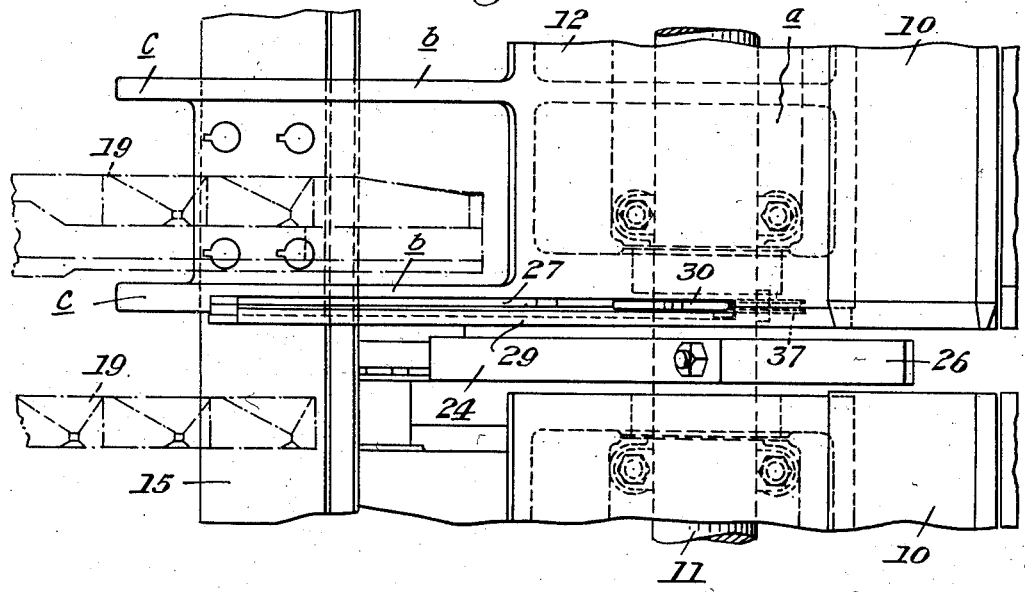

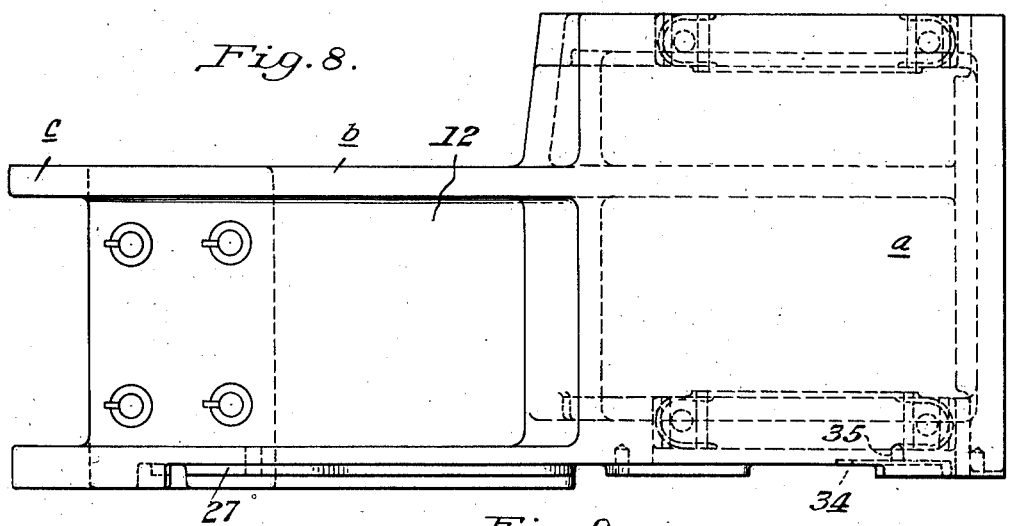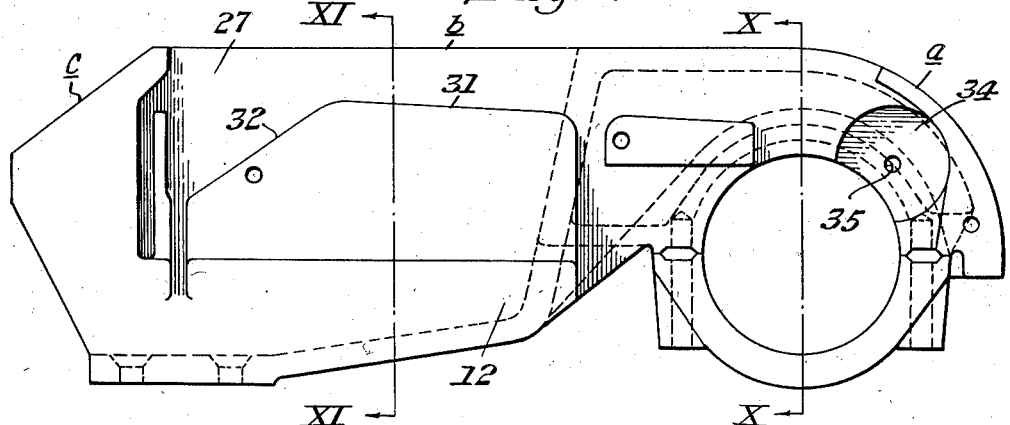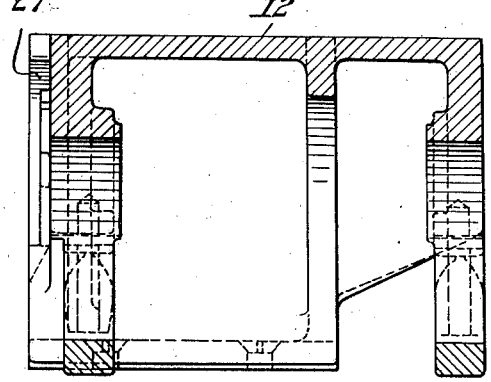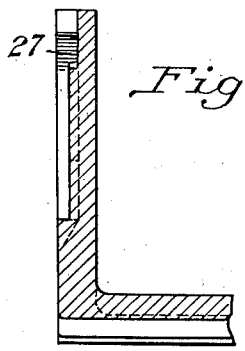

April 10, 1934.  G. L. FISK ET AL  1,954,123
COOLING BED
Filed July 11, 1931   8 Sheets-Sheet 8
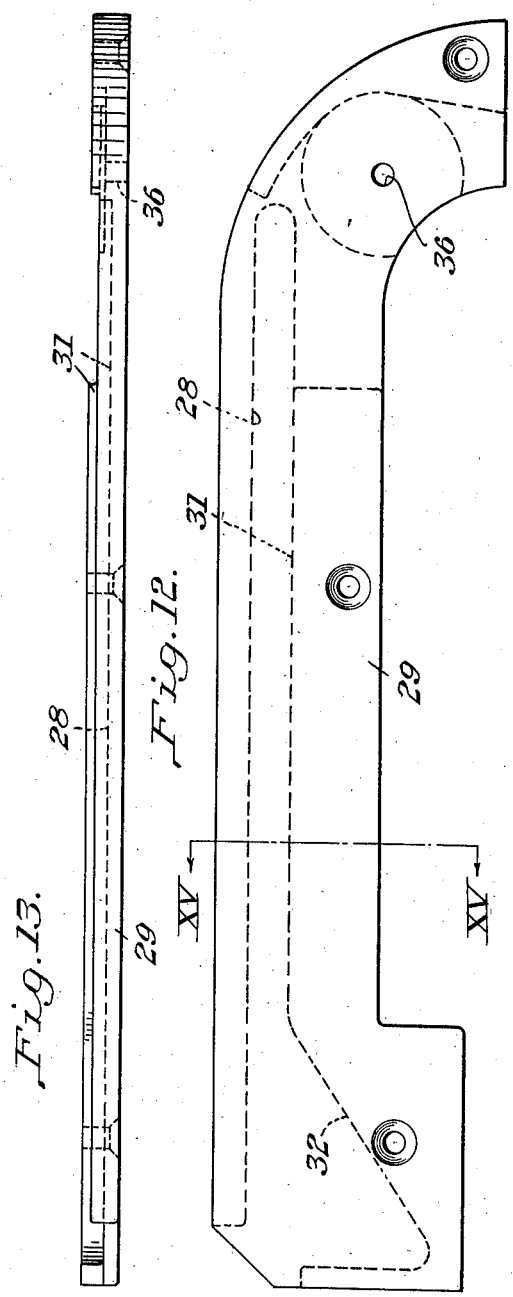
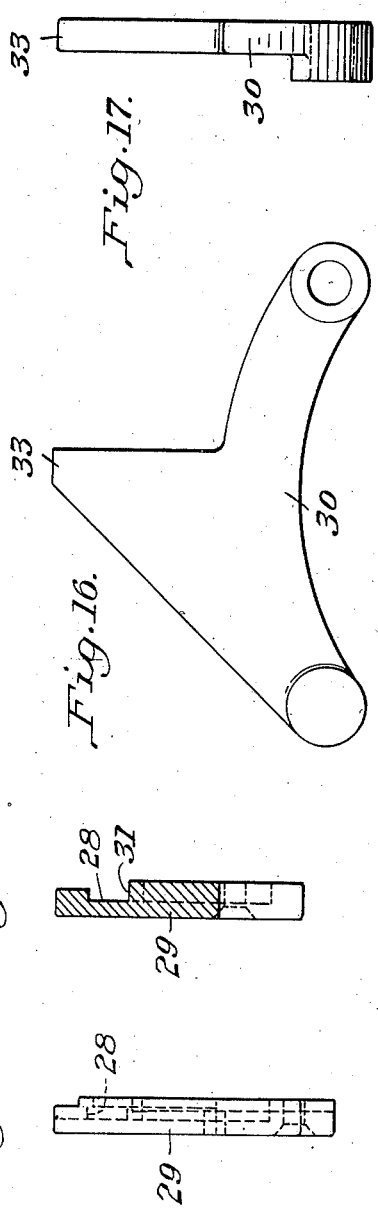
INVENTORS Patented Apr. 10, 1934

1,954,123

UNITED STATES PATENT OFFICE 1,954,123

COOLING BED

Gustaf L. Fisk, Pittsburgh, and Edward T. Peterson, Reading, Pa., assignors to Mesta Machine Company, Homestead, Pa., a corporation of Pennsylvania Application July 11, 1931, Serial No. 550,066

13 Claims. (Cl. 80—42)

The present invention relates broadly to material handling, and more especially to metal working apparatus commonly referred to as cooling beds or conveyors.

In the art of metal rolling, it is customary in many cases to deliver the rolled material while hot to a run-in table or conveyor comprising a series of moving rollers, then transfer the material across a suitable supporting and cooling surface, and then remove the cooled material and transfer it to a suitable point for storage or other purposes. Such apparatus is ordinarily described as a cooling bed, having reference to the function performed during the passage of the material thereover.

The present invention relates to apparatus of this character. In order that a cooling bed may function efficiently, there are several requirements which must be fulfilled by the apparatus. It must be capable of handling bars, of generally oblong cross section, either singly or in packs; of handling squares either singly or in packs, and of handling rounds either singly or in packs. It must also be capable of effectively handling irregular sections.

Where articles of the character referred to are handled singly, they are maintained in more or less spaced relation to insure cooling with comparative rapidity. Where they are handled in packed formation, the different articles are in such closely adjacent relationship that the rate of cooling is materially reduced.

The present invention has for one of its objects an improved cooling bed structure whereby shapes of the character referred to may be handled in accordance with either one of the methods described.

In the rolling of irregular sections, such as angles and the like, it is frequently desirable to maintain the sections in the same relative position during cooling which they occupied during the rolling operation. The present invention has for another of its objects the provision of an apparatus which will satisfactorily function in this manner.

In the accompanying drawings there is shown more or less diagrammatically, a preferred embodiment of our invention. In the drawings:

Figure 2 is a view similar to Figure 1, illustrating the parts in a slightly different position;

Figure 3 is a view similar to Figures 1 and 2, illustrating still another characteristic operation of the apparatus;

Figure 4 is a similar view illustrating a continuance of the operating condition illustrated in Figure 3;

Figure 5 is a top plan view of the apparatus of the foregoing figures, Figure 1 being a section on the line I—I of Figure 5;

Figure 6 is a detail plan view on an enlarged scale, of a portion of the apparatus illustrated in Figure 5;

Figure 7 is a side elevational view, on an enlarged scale, of one of the article transfer members;

Figure 8 is a top plan view, on an enlarged scale, of one of the grate members;

Figure 9 is a side elevational view of the grate member illustrated in Figure 8;

Figure 10 is a detail sectional view on the line X—X of Figure 9;

Figure 11 is a detail sectional view on the line XI—XI of Figure 9;

Figure 12 is a side elevational view of one of the grate member plates;

Figure 13 is a top plan view of the plate shown in Figure 12;

Figure 14 is an end elevational view of the plate of Figures 12 and 13;

Figure 15 is a transverse sectional view on the line XV—XV of Figure 12;

Figure 16 is a side elevational view of one of the article holding dogs; and

Figure 17 is an end elevational view of the dog of Figure 16.

Figure 1:
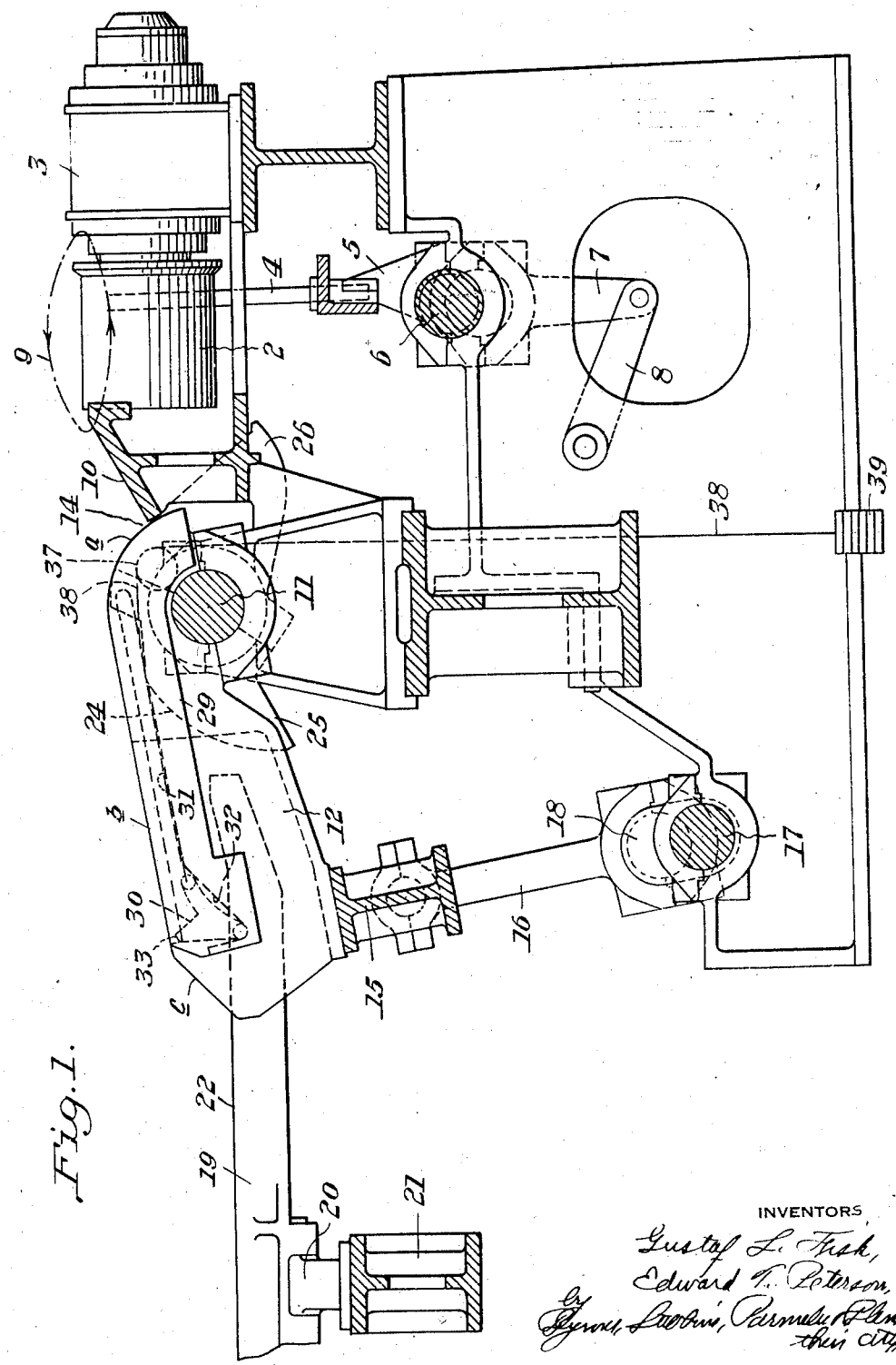
Figure 1 is a view partly in side elevation and partly in section, of a portion of a cooling bed constructed in accordance with the present invention.

By reference to Figure 1 of the drawings, it will be apparent that there is provided a material handling apparatus comprising a roller conveyor 2 preferably composed of a series of individual rollers each having its own driving motor 3, as shown in Figure 5. These rollers constitute a run-in conveyor for bringing hot rolled material from the mill to the cooling bed. This conveyor may, however, constitute any desired structure capable of effecting a longitudinal feeding movement of the material to be handled.

Extending upwardly between the adjacent supporting members of the conveyor are transfer or kick-off fingers 4 carried by arms 5 adapted to be actuated by a crank shaft 6 rotated in any desired manner by mechanism not shown. The arms 5 are journaled on the crank shaft, and their orbital path of travel is controlled by providing the same with extensions 7 connected to links 8. During rotation of the shaft 6, the upper ends of the fingers 4 will be caused to travel substantially in the orbital path 9 shown in chain lines in Figure 1. By reference to this figure, it will be noted that the return or idle movement of the fingers is obtained with the upper ends thereof below the supporting plane of the conveyor 2, while the transfer movement is obtained with the fingers materially above the supporting plane of the conveyor, the movement being in such direction that an article supported on the conveyor will be given a broad-side movement onto a downwardly inclined transfer surface 10. This surface is preferably of such length as to constitute in effect an extension of the conveyor, whereby the possibility of jamming of articles during the transfer from the conveyor to the transfer surface is precluded.

Adjacent the transfer surface 10 is a shaft 11 adapted to be rotated in any desired manner either by hand or by a suitable motor, not shown. Journaled at one end on the shaft are grate members 12, forming a transfer section of the cooling bed, one of which is illustrated in detail in Figures 8 to 11, both inclusive. Such a grate member has a top working surface which may be considered as divided into three sections, these being respectively, an arcuate section $a$, a straight section $b$ and a downwardly sloping section $c$. By reference more particularly to Figure 9 of the drawings, it will be noted that the intermediate section $b$ is tangent to the arc of the section $a$.

By reference to Figure 1, it will be noted that the arcuate section $a$ extends downwardly in such manner as to intersect the plane of the delivery or transfer surface 10, the relative position of these parts being such that a retaining groove or valley 14 is formed intermediate the two adapted to receive articles as delivered by the transfer surface and check the further downward movement thereof. The impact of such articles, and more particularly in the case of rounds, against the arcuate surfaces assists in straightening the same as well as in checking the further descent thereof.

The opposite ends of the grate members 12 are carried on a beam 15 to which are pivotally connected the upper ends of pitmen 16, these pitmen being raised or lowered by a shaft 17 herein illustrated as comprising a crank shaft similar to the shaft 6, and like the shaft 6, rotatable in any desired manner. In Figure 1, the shaft 17 is shown in such position that the cranks 18 are effective for holding the beam 15 in its elevated position, while in Figure 2 the shaft is shown as having rotated sufficiently to lower the beam 15. As the beam lowers, it will be noted that the grate members are swung about their pivotal mountings on the shaft 11, thereby imparting to the upper surface thereof a materially greater inclination. The construction of the parts is such that with the grate bars in the position illustrated in Figure 1, they will not have sufficient inclination to permit a gravity discharge of rectangular shapes thereover, while in the position illustrated in Figure 2, such a gravity discharge will be obtained.

Extending in article receiving relation to the grate members 12 is a series of spaced parallel bars 19 forming a carry-over section of the bed. These bars are diagrammatically shown in the drawings as having pivotal mountings 20 on beams 21 such that the bars may be partly rotated about their longitudinal axes. When rotated to one position they will afford a substantially smooth article receiving surface 22, as indicated for example in Figures 1 and 4 of the drawings, while when rotated to another position they will provide an article receiving surface comprising a series of notches 23.

Secured to the shaft 11 for rotation therewith, is a series of article transfer members 24, one of which is illustrated in side elevation in Figure 7. Each of these transfer members comprises a pair of substantially diametrically opposed transfer arms 25 and 26, either of which may be brought into effective transfer position by rotation of the shaft 11.

*Spaced cooling*

It may be assumed that the structure thus far generally described, is to be utilized for obtaining movement of bars B across the cooling bed in spaced formation. For this purpose reference may be had particularly to Figure 2, in which the grate members 12 are in their maximum inclined position so that a bar delivered thereto will slide across the straight portions $b$ thereof by gravity. An article B having been delivered to the transfer surface 10, as shown at the right of Figure 2, is in position to be engaged by the transfer arms 26 of the transfer members 24. These members are shown in full lines in Figure 2 in the position which they normally occupy during the delivery of a bar to the transfer surface.

The bar having reached approximately the position on the surface 10 shown in the drawings, the shaft 11 is rotated in a counter-clockwise direction, and the transfer arms 26 rotate from their full line to the chain line position, in which position the supporting surfaces of the arms 26 constitute a continuation of the portions $b$ of the grate bars, thus permitting articles on the arms 26 to slide across the grate bars by gravity, as indicated in the drawings, and onto the bars 19. These bars may be operated in any desired manner, as shown for example in the patent to Fisk, No. 1,761,470 of June 3, 1930, for effecting a progressive step by step movement of the individual bars thereacross. The bars having traversed the cooling bed may be delivered to a run-out conveyor (not shown) of any desired construction.

If rectangular shapes or rounds are to be handled singly, the parts may be positioned and operated in a manner similar to that just described for the bars B. This will likewise be true of the handling of irregular sections such as angles. With such irregular sections, they will be supported by the arms 26 in the same relative position in which they are supported on the conveyor 2 and will maintain this same position in sliding across the arms 26 and the grate bars 12, thus permitting cooling thereof on the bars 19 in the same relative position in which they were rolled.

*Pack cooling*

By reference to Figures 8 to 11 of the drawings, it will be noted that the grate bars 12 are provided in one face thereof with a groove 27. This groove is adapted to aline with a groove 28 formed in the side of grate bar plates 29 constructed to be attached to the sides of the grate bars. When thus attached, the grooves 27 and 28 form a track for dogs 30. Each track comprises a relatively straight portion 31 and an abruptly inclined portion 32. In Figure 2 of the drawings, one of the dogs 30 is illustrated in position on the abruptly inclined portion 32 in which position the upper end 33 of the dog is below the supporting plane of the grate bars In Figure 3, however, one of the dogs 30 is illustrated on the substantially straight portion 31 of the track, in which position it projects above the plane of the supporting surface of the grate bars as will be clearly apparent. In Figure 4 one of the dogs is illustrated in an intermediate position.

Formed in the side surface of each grate bar is a circular recess 34 having a sheave opening 35 adapted to aline with a sheave opening 36 in a grate bar plate 29 and thus, with the parts assembled, form a mounting for a sheave 37. Adapted to be secured to each of the dogs is a chain or cable 38 which passes around a sheave 37 and thence downwardly to a counterweight 39, the counterweight being so selected that while it is effective for holding one of the dogs in any position to which it may be adjusted, it is not of sufficient weight, by itself, to move one of the dogs from its adjusted position.

With pack cooling, the parts are initially disposed as illustrated for example in Figure 3 of the drawings in which the grate bars 12 are elevated and the dogs 30 are adjacent the arcuate sections a of the grate bars, but spaced therefrom a slight distance. The transfer members 24 are rotated substantially 180° from the position described in connection with spaced cooling, and as illustrated in Figures 1 and 2 of the drawings. In this position the arms 25 underlie the plane of support of the transfer surface 10, and in substantial parallelism thereto.

A bar B having been delivered to the transfer table, the shaft 11 is rotated in a counterclockwise direction from its full line position of Figure 3 to its chain line position, thus carrying a bar B from the transfer surface 10 to the substantially upright edge supported position of Figure 3 on the straight sections b of the grate bars. As this operation is repeated, the successive bars gradually push the dogs 30 from the position of Figure 3 into the position of Figure 4, the movement being a step by step movement in increments each substantially equal to the thickness of one of the bars. This forms a pack P as illustrated in Figure 4, the pack remaining intact until the dogs 30 assume such a position adjacent the trackway 32 as to permit the leading bars to topple forwardly. Having toppled, they slide by gravity down the sections c of the grate bars, onto the cooling bars 19, which are operated in such timed relation to the operation of the transfer members 24 as to maintain the bars in spaced relation on the cooling bed. Such an operation gives a pack cooling or pack annealing followed by an individual cooling.

The operation just described is also effective for the pack annealing or pack cooling of rounds or squares, as well as of irregular sections of such contour as to permit nesting to the extent required for such a pack formation.

While the preceding condition may be utilized for the pack handling of rounds, of such cross section that they will roll freely, a different procedure is preferably followed. With such shapes, the parts are preferably placed in the position illustrated in Figure 1 of the drawings with the arms 26 in position to engage a round in the valley 14, and when rotated, roll such round over the arcuate sections a onto the straight sections b, down which the rounds roll by gravity being transferred from the sections b to the cooling bars 19 by the inclined sections c. The first bar having reached the cooling bed, will act as a stop for subsequent bars, thus causing succeeding rounds to form a pack on the cooling bars instead of on the grate bars. In such case the grate bars merely serve as a transfer surface for the rounds, and accomplish no more cooling thereof than the most infinitesimal amount which is obtained while the rounds are passing thereover, the action in this respect being similar to that obtained with the spaced cooling of articles as illustrated in Figure 2.

Certain advantages of the present invention arise from the fact that the structure disclosed lends itself to the spaced cooling of shapes of any desired characteristics or to the cooling or handling of the same in packed formation.

Other advantages of the invention arise from the provision of the grate bars which afford a surface the inclination of which may be varied at will to change the characteristic operation obtained thereby.

Other advantages arise from such a grate bar structure in combination with rotatable transfer members having arms selectively available for giving different characteristic transfer conditions.

Still other advantages will be apparent to those skilled in the art from the foregoing description, taken in connection with the accompanying drawings forming a part thereof, it being understood that changes in the construction and operation of the parts may be made without departing from the spirit of our invention or the scope of our broader claims.

We claim:

1. In a cooling bed, a series of grate bars, means for changing the inclination of the supporting surfaces of said grate bars, means for delivering articles to a position adjacent the grate bars, and rotatable means for transferring the articles onto the grate bars, said rotatable means providing arms of different transfer characteristics selectively available at the will of the operator.

2. In a cooling bed, a run-in conveyor, cooling bars, transfer means intermediate the conveyor and cooling bars comprising an article supporting surface of adjustable inclination, and rotatable members for delivering articles to said surface, each of said rotatable members having a plurality of transfer arms of different transfer characteristics selectively available at the will of the operator.

3. A cooling bed comprising a run-in conveyor, cooling bars, a rotatable shaft intermediate said conveyor and bars, grate bars pivotally mounted at one end on said shaft, means for adjusting the position of the opposite ends of said grate bars, transfer members secured to said shaft for rotation therewith, and means for rotating said shaft to effect operation of the transfer members.

4. A cooling bed comprising a run-in conveyor, cooling bars, a rotatable shaft intermediate said conveyor and bars, grate bars pivotally mounted at one end on said shaft, means for adjusting the position of the opposite ends of said grate bars, and transfer members secured to said shaft for rotation therewith, each of said transfer members having a plurality of arms selectively available at the will of the operator.

5. In a cooling bed, a conveyor, cooling bars, and grate bars, means for transferring an article from the conveyor to a position adjacent the grate bars, and rotatable means having transfer arms of different contour selectively available for delivering the article to the grate bars.

6. In a cooling bed, a conveyor, cooling bars, and grate bars, means for transferring an article from the conveyor to a position adjacent the grate bars, and rotatable means for delivering the article to the grate bars, said rotatable means comprising a plurality of arms selectively available at the will of the operator.

7. A cooling bed comprising a run-in conveyor and a carry over section including spaced bars, a transfer section having a position in which it is effective to deliver material discharged thereon immediately to said carry over section, and a position in which it is effective to accumulate a plurality of articles thereon and to deliver articles to said carry over section only when an additional article is discharged on the transfer section, means for shifting the transfer section from one position to another, and means for discharging articles from the conveyor to the transfer section.

8. A cooling bed comprising a carry over section including a plurality of spaced bars, and a transfer section effective in one position for delivering hot material to said bars as soon as received, and effective in another position to receive and hold hot material thereon until substantially cooled before delivery to said bars, means for shifting the transfer section from one position to the other, and means for supplying hot material to the transfer section.

9. In a cooling bed, a transfer section effective in one position for discharging material delivered thereto substantially immediately and in another position to accumulate a quantity of material thereon for pack cooling, and means for changing the position of the section at will.

10. A cooling bed transfer section comprising a plurality of members adjustable to two positions in one of which they define an inclined plane for immediately discharging material delivered thereto, and in the other of which they define a plane for supporting material during cooling, and means for changing the adjustment of said members.

11. In a cooling bed, a run-in conveyor, cooling bars extending laterally thereof, connecting means intermediate the run-in conveyor and cooling bars, including grate bars mounted for tilting movement, transfer members cooperating with said grate bars, said transfer members being rotatable to working positions, and effective in one for lifting material flatwise from the conveyor for sliding movement down the grate bars, and in the other, for rotating material edgewise on to the grate bars.

12. In a cooling bed, cooling bars, grate bars extending laterally of the cooling bed and tiltable about a fixed axis to discharge material at various angles on to said cooling bed, said grate bars having straight delivery portions and charging portions of circular outline centering on said axis, and transfer arms rotatable about said axis for moving material around said charging portions for sliding movement down said delivery portions, said arms having arcuate portions similar to the circular charging portions of the grate bars, with substantially tangential and radial projections therefrom operable selectively to discharge material flatwise or edgewise, respectively, on to said bars.

13. A cooling bed including a carry over section and a transfer section, the transfer section being effective for discharging hot material received thereon substantially immediately to the carry over section for spaced cooling, and for holding the hot material for a period to produce pack cooling, and transfer members for supplying hot material to the transfer section, said members having an arcuate portion with substantially tangential and radial projections operable selectively to cause the transfer section to operate according to either of said aforementioned methods.

GUSTAF L. FISK.
EDWARD T. PETERSON.